United States Patent [19]

Wilke

[11] 4,398,691

[45] Aug. 16, 1983

[54] WALL BRACKET

[76] Inventor: Rudolf H. Wilke, 2 Marsberger Str., 3548 Arolsen, Fed. Rep. of Germany

[21] Appl. No.: 224,940

[22] Filed: Jan. 14, 1981

[30] Foreign Application Priority Data

Jan. 15, 1980 [DE] Fed. Rep. of Germany ....... 3001281

[51] Int. Cl.³ .............................................. E04G 3/08
[52] U.S. Cl. .................................................. 248/235
[58] Field of Search ............... 248/542, 235, 239, 240, 248/247, 149, 315, 311.2, 312; 5/451

[56] References Cited

U.S. PATENT DOCUMENTS

| | | | |
|---|---|---|---|
| 3,469,493 | 9/1969 | Fisher | 248/239 X |
| 4,088,250 | 5/1978 | Schaefer | 248/315 X |
| 4,220,311 | 9/1980 | Wolff | 248/315 X |
| 4,256,281 | 3/1981 | Harris et al. | 248/315 X |

Primary Examiner—William E. Lyddane
Assistant Examiner—Ramon O. Ramirez

[57] ABSTRACT

A wall bracket consists of a hoop-like part with hollow cavities in its two ends which can be slipped over male supporting parts fixed to a wall. Possible malalignment and positional inaccuracy of the supporting parts is catered for by a construction in which each supporting part consists of a base part and a head part which are secured to the wall by a central fixing screw passing through large clearance holes in the base and head part to accommodate positional inaccuracies. In addition the mating end faces of the base and headparts are of complementary part spherical form so that the head part can be angled relative to the base part to compensate for malalignment.

21 Claims, 15 Drawing Figures

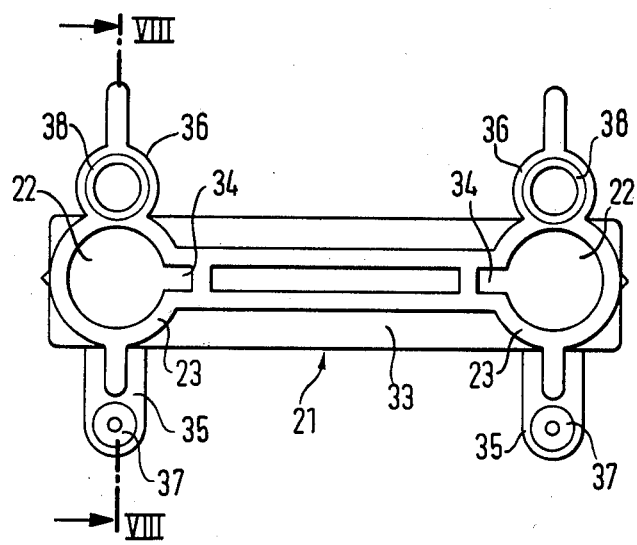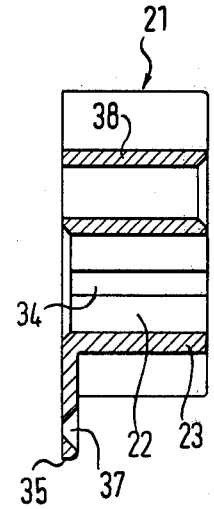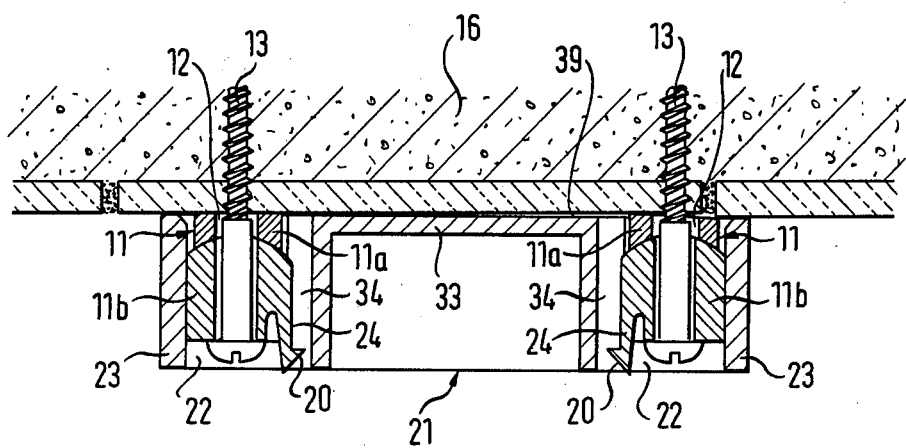

WALL BRACKET

FIELD OF THE INVENTION

The present invention relates to a wall bracket and has particular reference to a wall bracket of the type having a hoop-like part, in particular of moulded synthetic material, which has hollow cavities in its two ends and which is mounted on the wall by pushing the two hollow cavities over respective male supporting parts mounted on the wall. This type of bracket is usually designed to support articles which fit within the hoop-like part.

BRIEF DISCUSSION OF THE PRIOR ART

Brackets of the above described type are used, by way of example, for supporting articles such as tooth mugs, soap dishes, glass shelves and ash-trays. As the article to be supported by the bracket is frequently made with the same form as the bracket, so that it can be accurately seated and held in the desired position in the bracket, it is important that the bracket retains its manufactured shape when it is mounted on the wall. The bracket may for example be generally U-shaped with the two hollow cavities in the ends of the legs of the hoop-like part being arranged so that they open at right angles to the wall on which the bracket is to be fixed.

For this reason, it is necessary to ensure that the supports for the bracket are fixed at right angles to the wall parallel to one another and with the correct distance between them. If these conditions are not satisfied it may prove impossible to mount the hoop-like part of the bracket or the elastic deformation will occur so that the articles to be supported by the bracket, such as a tooth mug, with either jam of simply drop through the bracket onto the floor.

OBJECTS OF THE PRESENT INVENTION

The principal object of the present invention is to provide a wall bracket of the type named above which makes it possible to ensure, without resorting to complex structure or complex operations, that the male supporting parts are truly at a right angle to the wall and are correctly spaced from one another so that, afte fixing the supporting parts, the hoop-like part may be slipped over and on to the male supporting parts and secured in position adjacent the wall.

A second object of the present invention is to provide a wall bracket of the kind named above which can be fitted without distortion to a wall even if the wall is uneven.

A third object of the present invention is to provide a wall bracket of the kind named above which can be mounted on a wall even if the screw holes for the screws securing the associated supporting parts are positioned inaccurately.

Further objects underlying the invention will become apparent on considering the following description, the drawings and the claims.

BRIEF OUTLINE OF THE INVENTION

In order to accomplish the above listed objects there is provided, in accordance with the present invention a bracket comprising a hoop-like part, in particular of moulded synthetic material and adapted to fittingly accommodate one or more articles which are to be supported by the bracket, and means for fixing first and second ends of said hoop-like part to a wall or surface said means comprising first and second male supporting parts receivable in correspondingly shaped first and second cavities in said first and second ends and securable to said wall by respective fixing screws and wherein each said male supporting part comprises a base part and a head part, said base part having a flat end face for mounting against said wall, a part spherical end face and a central screw hole extending between said flat end face and said part spherical end face with said central screw hole having a diameter markedly larger than the diameter of an associated fixing screw and said head part having a part spherical end face complementary to the part spherical end face of said base part, a central screw hole again markedly greater in diameter than the diameter of an associated fixing screw and an outer profile complementary to the internal profiles of the associated one of said cavities there being further provided means for securing said hoop-like part to said head parts.

For fixing the male supporting part a center punch is firstly used for marking as truly as possible the positions of the holes to be drilled in the wall for the screws and, after drilling the male supporting parts are only screwed on loosely. For truing up the supporting parts may still be moved sideways because of the play between them and the screws. Furthermore the head parts may be tilted somewhat relative to the base parts about the part spherical end faces thereof until the head parts which engage in the hollow cavities in the ends of the hoop-like part are truly normal to the wall and parallel to each other. When the fixing parts have been screwed in position and have been partly fixed, it is thus still possible for the necessary alignment of the supporting parts to take place without any change in the position of the fixing screws.

A specially good effect is produced if the base parts and head parts of the supporting parts, and furthermore the hollow cavities, are cylindrical.

In particular, the base part, as measured in the direction of the screw hole, may be one half to one quarter and more especially about one third of the thickness of the head part. In addition, particularly when using base parts with concavely curved part-spherical end faces, ring-like spaces can be provided between the side walls of the base parts and the inner walls of the hollow cavities with the radial widths of these ring-like spaces amounting to between one thirtieth and one tenth and particularly one fifteenth of the diameter of the base part while the annular spaces between the fixing screw and the head part and the fixing screw and the base part may be generally as broad as the aforementioned ring-like spaces.

As part of a first working example of the invention, the part-spherical end faces are centered on the axis of the screw hole in question on the side of the faces facing away from the wall or, expressed differently, the load bearing face of the base part, facing away from the wall, is concave or inwardly curved.

However, a more especially preferred working example of the invention makes possible a smaller sideways displacement of the base part when compensating for unevenness in the wall, an increase in the length of the guide between the head part and the hollow cavity in the bracket and a more stable shape for the base part. In this further embodiment of the invention the part-spherical end faces are centered on the axis of the screw hole in question on the side of the faces adjacent the wall. In other words the load bearing end face of the base part which faces away from the wall is convexly curved.

In a more especially preferred form of the invention the radius of the part-spherical faces may be 1 to 2, and more especially 1.2 to 1.7, times the radius of the cylindrical head part and furthermore may be 0.5 to 0.9, and more especially 0.6 to 0.8, times the axial lenth of the head part. Furthermore the radius of the part-spherical faces may be 10 to 20 mm and more especially 12 to 17 mm. If the radius of the part-spherical face is made too large, the base part will move too far out of line when compensating for unevenness of the wall. For this reason too large a radius of the part-spherical face will make it necessary to provide a large annular clearance and will reduce the range of errors and unevenness which can be tolerated or compensated. On the other hand, if the radius of the part-spherical faces is not large enough, the static loading of the fixing part will not be at the best value. For this reason it is best for the radiuses of the part-spherical faces to be such that, on the one hand, there is a good static loading of the supporting parts and, on the other hand, the annular clearances are not too large.

For joining the supporting part to the hoop-like part it is possible, as part of a further working example of the invention, for the head parts and the hoop-like part to be so joined by at least one radially directed connection part that the hoop-like part, when slipped onto the supporting part and resting against the wall, is locked in position so that it can not be pulled away from the wall. As a general point, the connection between the hoop-like part and the head part may be produced in a number of different ways, for example using a transverse screw or by some sort of latch or locking system.

The end face of the head part which faces away from the wall will be generally flat, this being in order for most purposes.

However, in order to take into account errors in angle it is possible, as part of a more especially preferred example of the invention, for the end face of the head part which faces away from the wall to be convex and part-spherical. A washer is then placed between the head of the fixing screw and this second part-spherical end face with the washer having a complementary part-spherical face which bears against the second part-spherical end face of the head part. The washer should also have a hole with a markedly greater diameter than the diameter of the fixing screw. The hole in the washer should preferably be the same size as the screw hole in the head part. In this embodiment the second part-spherical end face of the head part is best centered on the central axis of the screw hole at the level of the face between the base part and the wall. The face of the washer which is turned away from the head part, and on which the head of the fixing screw bears, should be flat.

It is of particular advantage if, for fixing the wall bracket in position, use is made of a drilling jig which has two guide cylinders or bushes with the same spacing as the desired spacing between the ends of the hoop-like part. The jig is furthermore best designed with two center punch holes and/or two guide bushes for drills with the center punch holes and/or the guide bushes being spaced apart at the desired distance. The jig makes it possible to drill fixing holes with substantially the correct distance between them for the fixing screws. The fixing parts are then slipped into the guide bushes and screwed up tight with the fixing screws which are taken up in the drilled holes. In this way the head parts are automatically accurately aligned relative to the wall.

LIST OF FIGURES

The invention will now be described in more detail by way of example only and with reference to the accompanying figures in which:

FIG. 7 is a front view of a jig used for guiding supporting parts of the wall bracket of FIGS. 1 to 6.

FIG. 8 is a view on the line VIII—VIII of FIG. 7.

FIG. 9 is a cutaway view or section on the same lines as FIG. 1, without however the hoop part, and showing a jig positioned against the wall.

Figure 14:
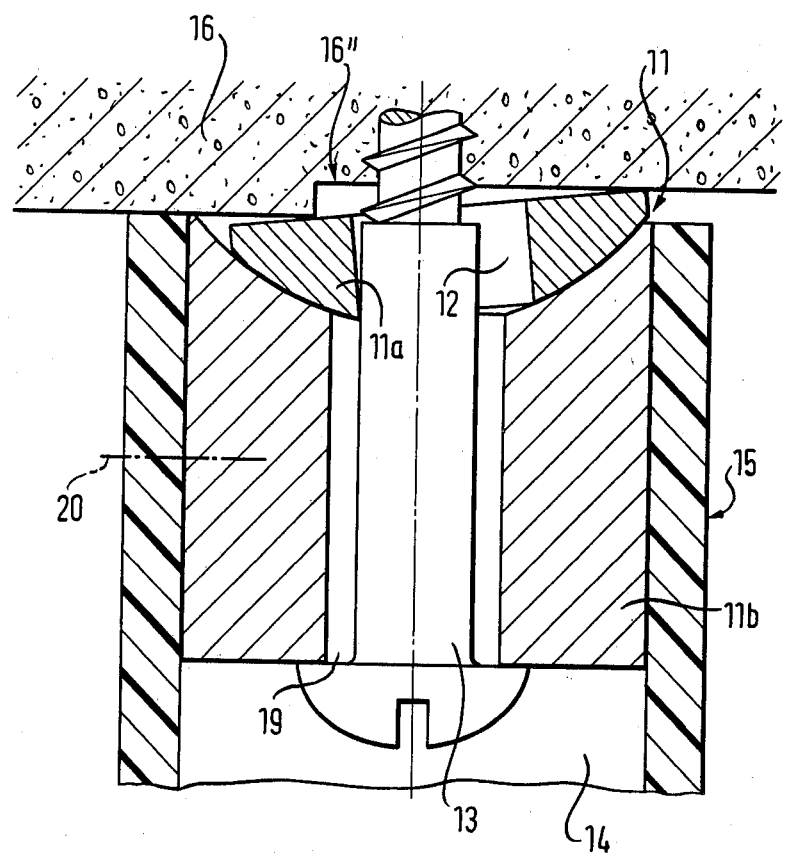
Figure 15:
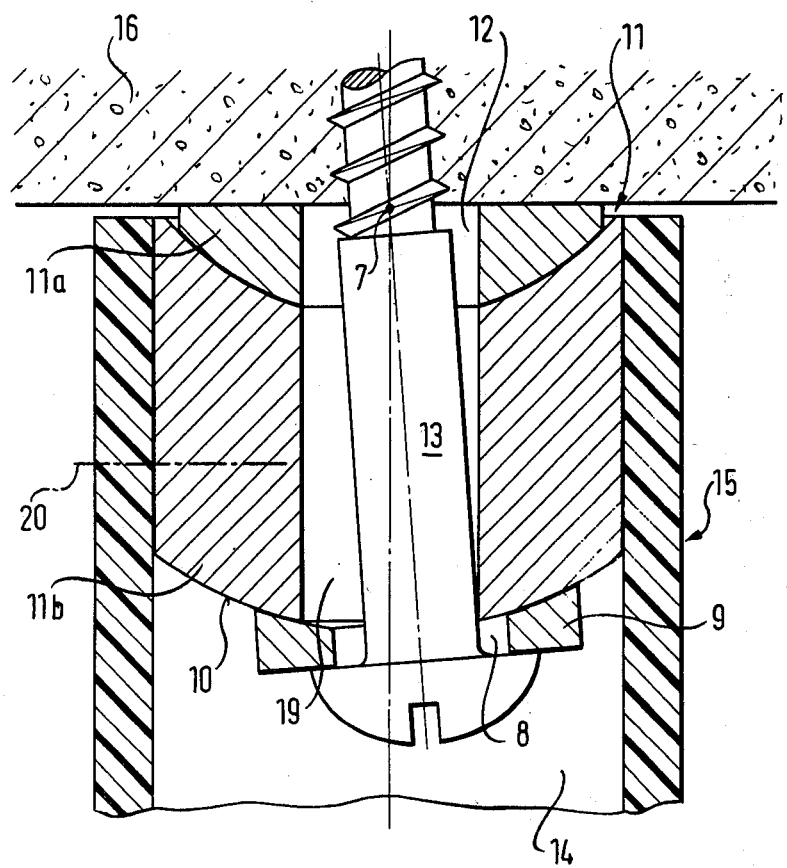

FIGS. 11 to 14 are axial sections, to a larger scale, of a further, preferred wall bracket of the invention near the position at which a male part is fixed to a wall, to make clear how, with the design of the present invention, errors in line-up of the different parts may be made good, and FIG. 15 is an axial section, on a greater scale, on the same lines as in FIGS. 11 to 14 of a further useful working example of the invention designed for taking into account larger errors in the line-up of the different parts.

DETAILED ACCOUNT OF WORKING EXAMPLES OF THE INVENTION

The wall bracket of the present invention is generally illustrated in FIGS. 1 to 6. As can be seen from FIG. 1 the bracket has a generally U-shaped hoop part 15 with two legs 15a 15b running towards a wall 16 at right angles thereto, the bracket being fixed to the wall. At their ends next to the wall 16, legs 15a and 15b have cylindrical hollow cavities or blind holes 14 opening towards wall 16. Hollow cavities 14 are in each case slipped onto a male supporting part 11, each such supporting part being made up of a base part 11a and a cylindrical head part 11b which will be seen in detail in FIGS. 4 to 6.

Both the base part 11a and the head part 11b have respective axial screw holes 12, 19 through which screws 13 are passed with marked radial play, the screws being screwed into wall 16.

Figure 2:
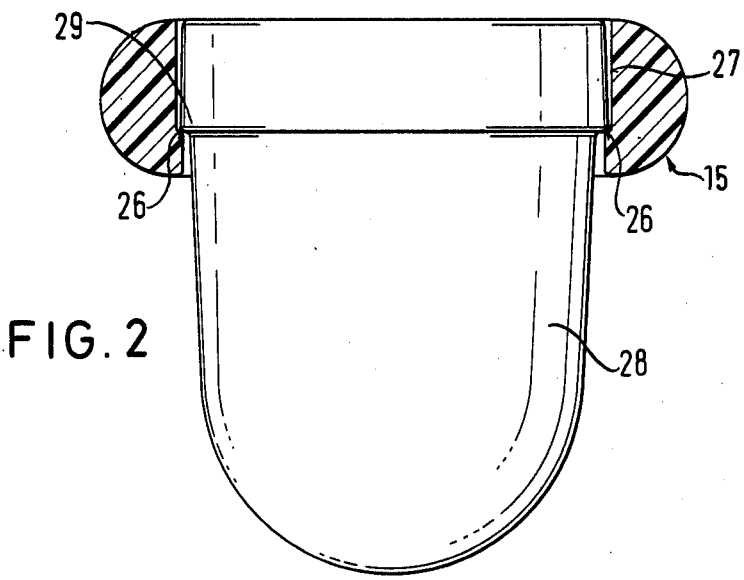
FIG. 2 is a part section on the line II—II of FIG. 1 with the tooth mug placed in the bracket.
Figure 1:
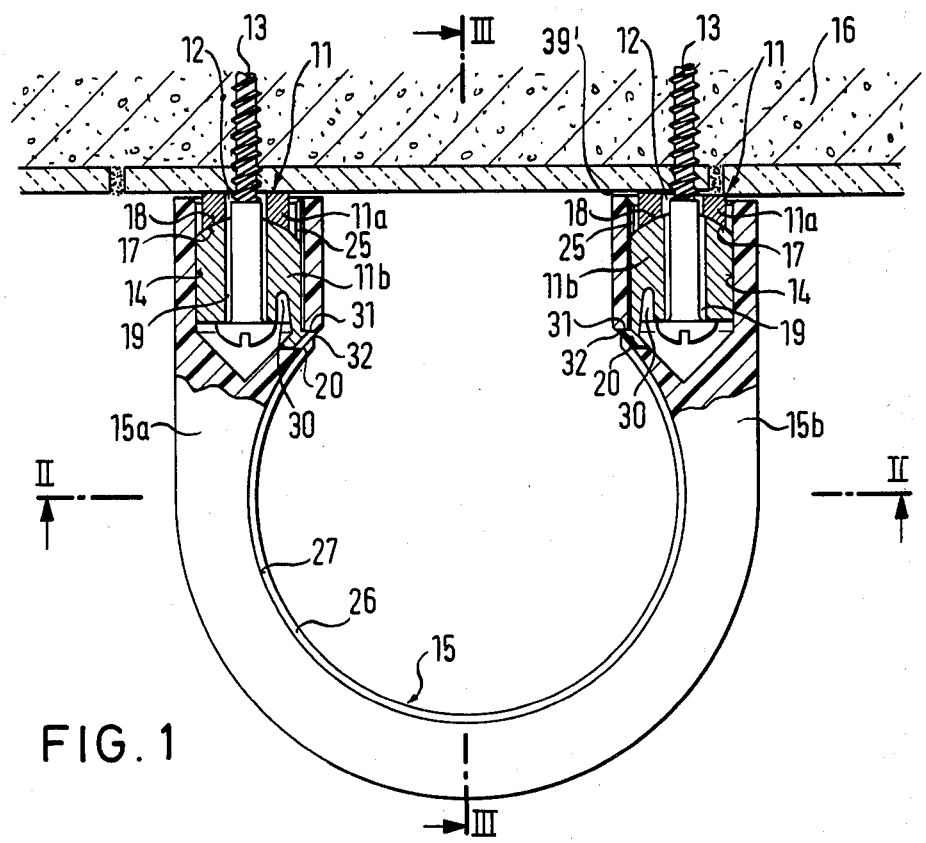
FIG. 1 is a partly cut away view of a bracket of the invention as fixed to a wall and designed for supporting a tooth mug or beaker.
Figure 3:
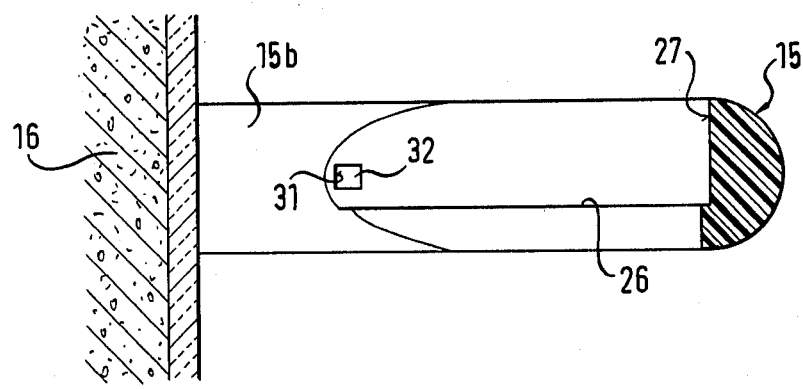
FIG. 3 is a section on the line III—III of FIG. 2.
Figure 4:
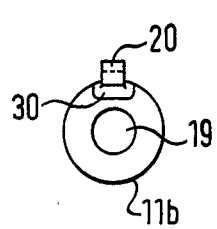
FIG. 4 is an end-on view of a head part of the wall bracket of FIGS. 1 to 3.
Figure 5:
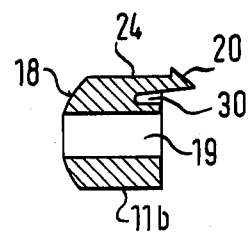
FIG. 5 is an axial section of the structure of FIG. 4.
Figure 6:
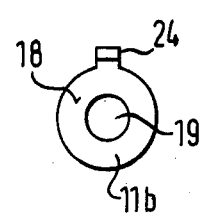
FIG. 6 is a view of the structure 4 looking in the opposite direction to that of FIG. 4.

As will be seen from FIGS. 1 to 3, hoop part 15 has an inner circular support shoulder 26 which is complete but for a part of about 90° nearest to the wall, where the loop is open because of the spacing between legs 15a and 15b. In the upper portion of the hoop part 15 there is an upwardly directed cylindrical face 27 which again is cut away, like shoulder 26 in the part of the loop nearest the wall, that is to say so that no complete circle is formed.

As will be seen from FIG. 2, a tooth cleaning beaker or glass 28 may be slipped into the bracket so that its edge 29, of greater diameter than the rest of the beaker, is supported on shoulder 26, the beaker being positioned in all radial directions because the cylindrical face 27 extends around the beaker over more than 180°.

Because, as part of the invention, shoulder 26 is very narrow, this being useful for example from the point of view of cleaning, it is important that the bracket be fixed to wall 16 without being bent or loosing its desired round form. For this purpose each male supporting part 11 is made up of two parts, that is to say the base part 11a and the head part 11b. Each base part 11a has a flat end face to be fixed against wall 16 while its other, opposite end is in the form of a concave, inwardly curved part-spherical end face 17. The axially longer head part 11b has at its end positioned against base part 11a a complementary convex or outwardly curved part-spherical face 18 nested within base part 11a for forming a connection therebetween. The opposite end face of head part 11b is once more flat.

Each head part 11b will be seen from FIGS. 1 and 4 to 6 to have an axially directed wing 24, whose end axially furthest from the part-spherical face 18 is cut clear at 30 from the body of the headpiece 11b so that a spring hook or latch 20 is formed. Before slipping the hoop part 15 onto the supporting parts 11, radial wing 24 makes certain of a radial line-up of head parts 11b with respect to axial grooves 25 in the structure limiting the hollow cavities 14 in the legs 15a, 15b of hoop part 15. At the end of each axial groove 25 furthest from the wall 16 there are abutment steps 31 on legs 15a and 15b which merge into rectangular openings 32 facing away from the wall 16 (see FIGS. 1 and 3) through which, by the use of a tool, the springing hooks 20 may be forced back and moved out of engagement with the steps 31.

The jig 21 to be seen in FIGS. 7 to 9 is used for fixing the supporting parts 11 of the wall bracket on the wall 16 so that they are fully trued up in the sense that it is then possible for the hoop part 15 to be slipped freely onto the supporting parts 11 without any force being necessary.

As made clear in FIGS. 7 to 9, the jig 21 of the present invention is made up of a cross-piece 33 having guide cylinders 23 at its ends with a spacing between them the same as the spacing between the hollow cavities 14 of the wall bracket of the invention to be seen in FIGS. 1 to 3. The cylindrical inner spaces 22 of cylinders 23 are of the same size as the head parts 11b. The axial length of the guide cylinders 23 is such that, with the jig in the position of FIG. 9, the head parts 11b are completely taken up within the guide cylinders 23. On their inner sides guide cylinders 23 have axial cutouts 34 representative of the form and placing of the axial grooves 25 of hoop part 15 (FIGS. 1 to 3), such grooves being designed for accommodating radial wings 24 of the headpieces 11b.

Above and below the guide cylinders 23 the jig 21 of the present invention is provided with eyes 35,36. The eyes 35 are made of generally thin material with short conical holes 37 which taper towards the wall and are used for guiding a center punch or for making marks on the material of the wall so that holes may be made for screws 13. The two upper eyes 36 on the other hand are defined by guide cylinders 38 which are of considerable axial length and are used to pilot drills for boring screw or dowel holes for the fixing screws 13.

An account will now be given of the fixing in position of the wall bracket of FIGS. 1 to 6 using the jig or template 21 of FIGS. 7 to 9.

Using the center punch holes 37 of jig 21, marks are firstly made on the wall 16 to assist in drilling holes for screws 13 at the desired level. The fixing screw holes are then drilled in wall 16. Alternatively, the guide cylinders or bushes 38 of jig 21 may are used for guiding the drill itself to produce the holes in the wall for the screws.

As the next step one base part 11a, a head part 11b and a screw 13 are slipped into one of the guide cylinders 23 (see FIG. 9). The wing 24 with spring hook 20 is lined up with the axial groove 34. Then the same is done at the other end of the jig.

The screws 13 are now screwed into wall 16 in the manner shown in FIG. 9. Head parts 11b retain their positions generally at right angles to wall 16 because of the part-spherical face on each base part 11a, even if the wall is generally uneven. This is made clear in FIG. 9 in the case of the right hand guide cylinder 23. Because of the uneven wall face base part 11a is somewhat at an angle, this however does not prevent head part 11b being generally normal to wall 16. The head part 11b may not be completely at a right angle to the wall, because the hoop part 15, which is later put in position will be at a slight angle to the wall, as can be seen from the narrow space 39 which becomes wider to the right, see FIG. 9. When the bracket is later mounted on the supporting parts (see FIG. 1) there will be a corresponding narrow space 39'. However, generally speaking and taking the uneven wall face into account, the bracket is then fixed in the best possible way.

After supporting parts 11 (see FIG. 9) have been fixed to wall 16, jig 21 is pulled off axially so that it is now only necessary for hoop part 15 with its hollow cavities 14 to be slipped over supporting parts 11 in a direction normal to the wall 16. Because of the sloping faces of spring hooks 20, the hooks are forced elastically inwards on pushing on legs 15a and 15b, the hooks 20 then sliding along grooves 25. As soon as they get into the position of FIG. 1, spring hooks 20 become locked behind steps 31 with a spring-locking effect and the hoop part 15 is now locked to wall 16 in its true or exact position. Because of the alignment of the supporting parts using jig 21 hoop part 15 is in no way bent or forced so that the article to be supported by it, for example the tooth cleaning beaker 28 of FIG. 2, is safely supported while at the same time not being jammed in position.

It will be seen for these reasons that the system of the invention makes it possible for the hoop part 15 to be fixed in position even with the wrong spacing between the screws, when the screws are not fully normal to the wall or if the base parts of supporting parts 11 are not quite at the right angle to the wall.

The lining up operation may take place quickly and simply using the jig of the invention, in which headpieces 11b are guided so as to be normal to the wall and accurately spaced from one another. It is furthermore possible for the supporting parts 11 to be fixed to the wall 16 without doing up the screws tight, jig 21 then being slipped over the still moveable headparts 11b so that they are lined up. Only when this has been done are screws 13 tightened and the jig 21 removed.

While in the working example of FIGS. 1 to 9 the base part 11a has an inwardly curved support face, the working example of FIGS. 11 to 14 has an outwardly curved or convex base part, the support face of the head part 11b then being correspondingly inwardly curved or concave. The convex curved form to be seen in FIGS. 11 to 14 of the end face furthest from wall 16 of base part 11a is better than a concave curved form, in as much as a smaller sideways displacement of the base part is sufficient to compensate for unevenness in the wall. Furthermore the length of the guide between the head part 11b and the hoop part 15 is greater. Lastly, in a convex design the form of the base part 11a is more stable.

It will be clear from FIGS. 11 to 14 that the use of the two part male supports of the invention enables the following errors in line up or alignment to be accommodated:
(a) an error in the spacing between the screw holes (out of line in a horizontal direction);
(b) the screw holes' not being on a horizontal line (vertical error in position);
(c) the screw holes' not being normal to the wall (screws not being true to the wall);
(d) uneven wall face, for example in the case of fixing on a pointed join between tiles.

The errors or inaccuracies (a) and (b) may be named trueness errors or spacing errors.

Figure 11:
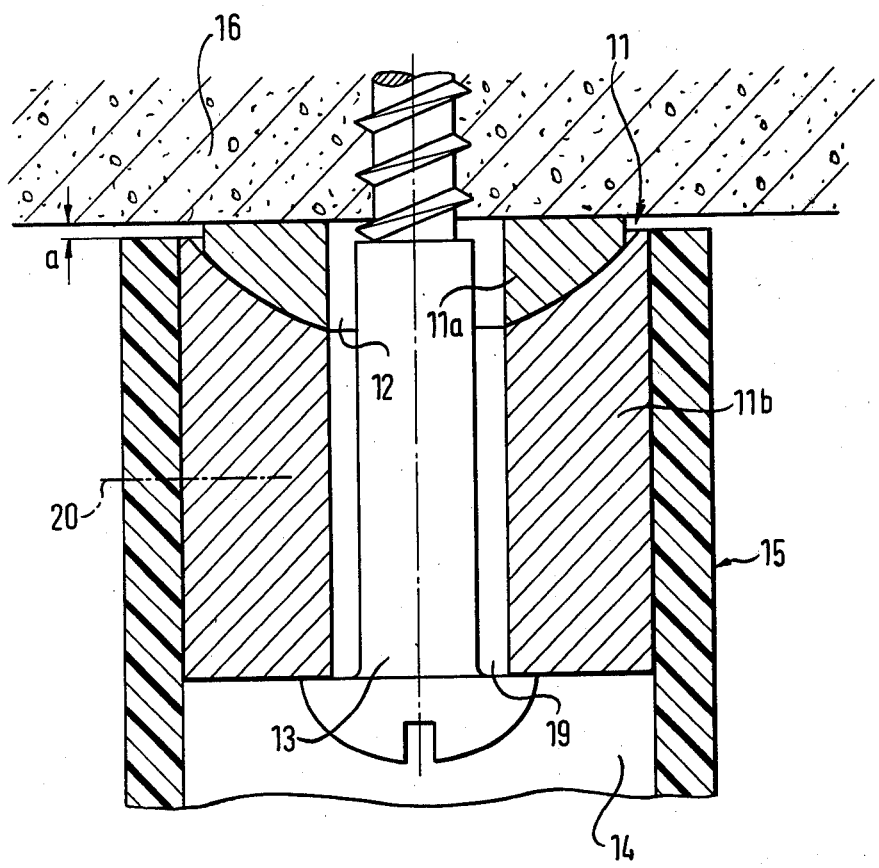

FIG. 11 is a view of the supporting part 11 so fixed to a wall 16 that it is free of the said errors and inaccuracies. If the ends of the hoop part 15 are fastened to the head parts 11b in the axial direction by a transverse pin, or by some other form locked connecting element which requires a defined depth of penetration of the head parts in the hollow cavities 14 in the ends of hoop part 15, it is important, in the ideal arrangement illustrated in FIG. 11, that a small clearance "a" is present between the wall 16 and the ends of the hoop part 15 and between the wall 16 and the ends of the head parts 11b. This clearance is required to allow for compensation for unevenness of the wall as will now be described in further detail with reference to subsequent figures of the drawings.

It should however be mentioned that the fastening of the ends of the hoop part 15 on the head parts 11b can take place in any desired manner. The connected can be a form locked connection by means of a transverse pin or screw as illustrated by a chain dotted line 20 in FIG. 11–15, or, by a latch mechanism as illustrated in FIGS. 1 to 6. The connection can however also simply take the form of either a force transmitting connection such as a clamp screw, or a clamp mechanism or of a material connection e.g. by the use of adhesive. For these latter connections it is generally not necessary to provide the above mentioned clearance "a".

The specially useful effect of the outwardly curved form of the base part 11a will be seen to be that (see FIG. 11) the head part 11b may extend as far as the end face of hoop part 15 nearest the wall 16 i.e. may be flush therewith. In this way the head parts 11b are ideally guided in the hollow cylindrical cavities 14.

Figure 12:
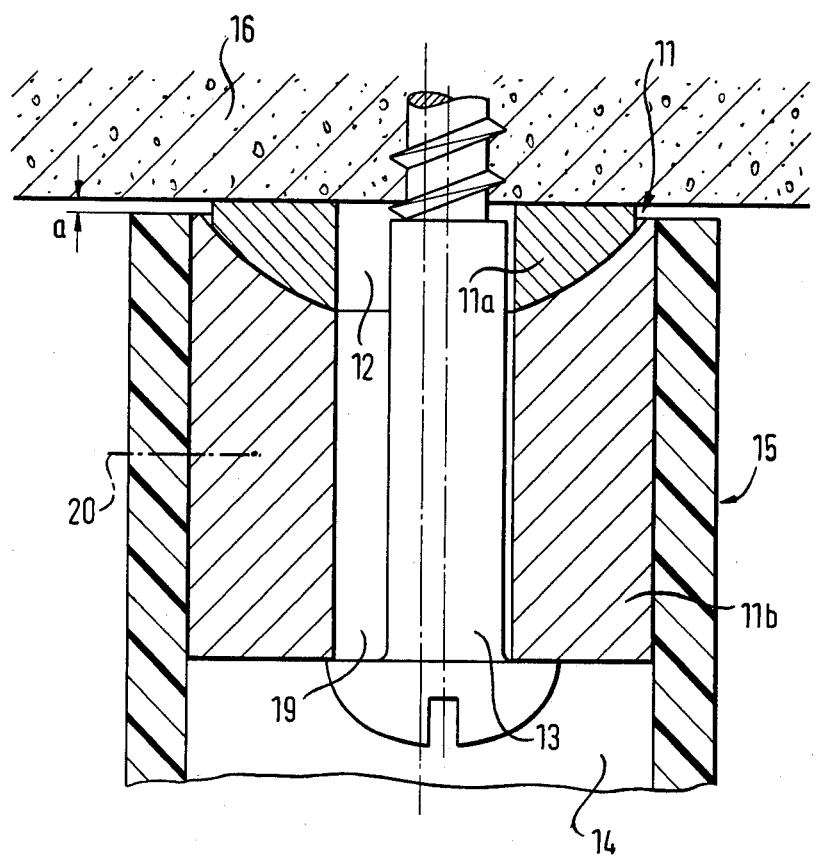
Figure 13:
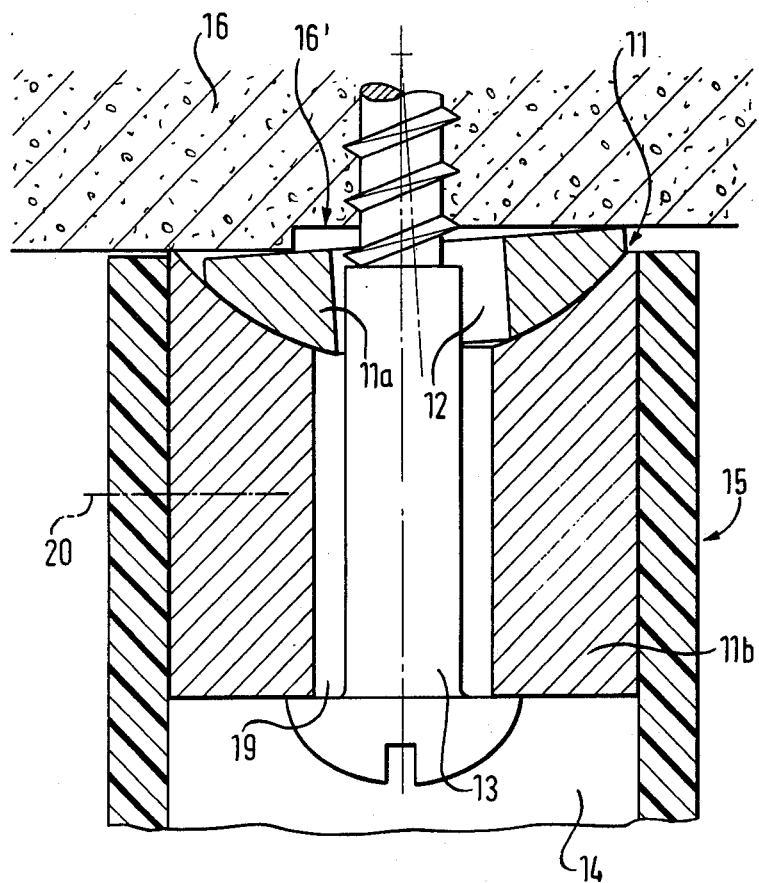

FIG. 12 is a section on the same lines as FIG. 11 in which however the screw is out of line with its true or desired position as shown by the extended chain dotted line.

It will be seen from FIGS. 12 and 14 how two steps 16' and 16'', which make the wall 16 uneven, can be compensated for by placing the base part 11a at an appropriate angle. FIG. 14 shows the greatest possible size of step or unevenness 16'' which can be accommodated with the illustrated size of the parts of the system of the present invention.

FIG. 15 is a section on the same lines as FIGS. 11 to 14 making it clear how the invention accommodates even large errors in the angle of the screw in relation to the wall.

In the case of this working example the base part 11a is once again outwardly or convexly curved. In addition however the end face 10, facing away from wall 16, of head part 11b has an outwardly curved part-spherical form which is centered (at 7) on the middle or center axis of head part 11b and is at the same level as the plane at which the base part 11a is resting against wall 16.

A washer 9 having a complementary inwardly concave end face bears on the convexly curved end face 10 of the head part 11b. The washer 9 has a hole 8 whose diameter is very much greater than that of fixing screw 13. The diameter of hole 8 is preferably equal to the diameter of screw hole 19. The end face of the washer 9 remote from wall 16 is flat and the head of fixing screw 13 bears against this flat end face.

The working example of FIG. 15 makes it possible for the screw head to bear evenly on all sides against washer 9 and, in turn, to bear evenly on head part 11b, even when screw 13 is greatly out of true with respect to its desired angle to wall 16. The large size of hole 8 additionally makes it possible for an incorrect spacing between the screws to be compensated.

It is of course possible with the design of the present invention to allow simultaneous compensation for all the possible errors in positioning and errors in angle of the screws within a wide range of tolerances.

Two points which are important for the size of the annular space around fixing screw 13 will now be considered in some detail.

In the interests of taking care of errors and unevenness the radial width of this annular space should be as large as possible. On the other hand the load carrying faces cannot be made too small otherwise the force per unit area becomes too large and the bracket either cannot be firmly fixed or the components become unstable. The supporting parts, if made of synthetic material, will have to have larger cross-sections and load-bearing faces than if the are made of metal. For this reason, dependent on the strength of the material used, the best possible compromise has to be made between, on the one hand, the greatest possible size of the errors which can be compensated for and, on the other hand, the stability of the arrangement.

When the part spherical end face of the head part 11b extends up to the side wall of the hollow cavity, as shown in the embodiment of FIGS. 1 and 3 to 6 or, more generally, when the base part 11a can be displaced sideways so that it abuts the side wall of the hollow cavity 14, it is necessary for a ring-like space to be provided between the base part 11a and the wall of the hollow cavity 14. This situation generally only arises when the part spherical end face of the base part 11b is concave. The radial width of this ring-like space should however be smaller than the radial width of the annular space between the fixing screw 13 and the bore 12 of the base part 11a. The radial width of the ring-like space between the fixing screw 13 and the will bounding the hole 12 has to be great enough in fact to take into account errors in screw angle and screw spacing and furthermore unevenness of the wall, while the annular space between the base part 11a and the outer wall of the hollow cavity 14 only has to take account of uneveness of wall 16.

A relatively large annular space between fixing screw 13 and the edge of hole 12 of the base part 11a does not cause any particular design problems, because the load-bearing part-spherical faces are only made fractionally smaller.

The annular space between the fixing screw 13 and the edge of screw hole 19 in head part 11b has to be great enough to take care of spacing and angle errors. Because of the greater length of the head part relatively more space is needed for taking care of errors in angle. For this reason the screw hole 19 in head part 11b should also have a significantly greater diameter than the fixing screw 13. In order to ensure, even in the event of relatively large loads, that the spatial disposition of the male supporting parts is maintained after alignment of the base and head parts 11a, 11b and, if provided, the washer 9, and following clamping by the fixing screw, it is useful either to manufacture these parts of materials with a high coefficient of friction or to roughen the mating part spherical surfaces.

It is also possible to provide projections on one or more of the components of the male supporting parts which become impressed in the surface of the neighbouring part on tightening the fixing screw. The components with projections should in this case be made of harder material than the mating components.

Figure 10:
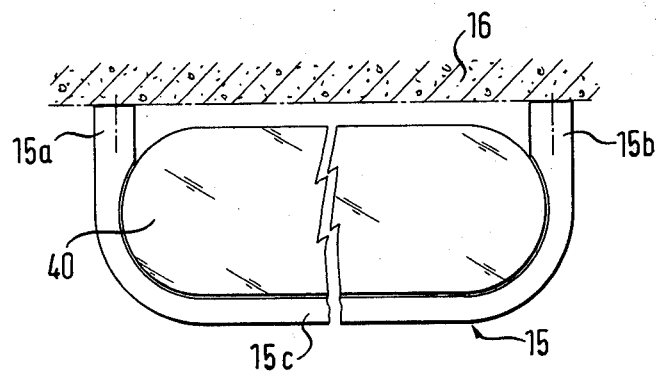
FIG. 10 is a plan view on the same lines as FIG. 1 of a bracket with a glass plate put in position therein.

FIG. 10 is a view of wall bracket with a hoop part 15 having a longer bridge part or straight 15c which is parallel to the wall, but however in other respects is quite the same as the working example of FIGS. 1 to 6. As is apparent from the drawing the bracket of FIG. 10 is designed for supporting and accommodating a glass plate 40 within hoop part 15 in place of the tooth cleaning beaker 28.

The fixing in position of the wall bracket of FIG. 10 is undertaken in the same way and with the same jig as in the other working example of the invention.

The male supporting parts or support units proposed for use with the present invention are not only suitable for the fastening of wall brackets at two points but can also be used for other wall fittings which require fitting to the wall at one or more points and the alignment of which is critical. The support units proposed by the present invention can for example also be used to support a towel rail mounted by one end to a wall and to support a shelf mounted at several points along one or more edges.

It will be appreciated by those skilled in the art that many constructional variations are possible without departing from the scope of the present teaching. It will in particular be appreciated that the outer ends of the spring hooks 20 can form flat abutments limiting the movement of the hoop part 15 towards the wall as illustrated in FIG. 1.

It will be further appreciated that it is not strictly necessary to secure the hoop-like part, to the head parts it being sufficient and in the case of a soap disk possibly even desirable for the hoop-like part to be simply plugged onto the male supporting unit or units.

I claim:

1. A bracket comprising a hoop-like part, in particular of moulded synthetic material and adapted to fittingly accommodate one or more articles which are to be supported by the bracket, and means for fixing first and second ends of said hoop-like part to a wall or surface, said means comprising first and second male supporting parts receivable in correspondingly shaped first and second cavities in said first and second ends and securable to said wall by respective fixing screws, and wherein each said male supporting part comprises a base part and a head part, said base part having a flat end face for mounting against said wall, a part spherical end face and a central screw hole extending between said flat end face and said part spherical end face, with said central screw hole having a diameter markedly larger than the diameter of an associated fixing screw and said head part having a part spherical end face complementary to the part spherical end face of said base part, a central screw hole, again markedly greater in diameter than the diameter of an associated fixing screw, and an outer profile complementary to the internal profile of the associated one of said cavities, there being further provided means for securing said hoop-like part to said head parts.

2. A bracket in accordance with claim 1 and wherein said part spherical surface of each of said base parts is spherically convex.

3. A bracket in accordance with claim 1 wherein said part spherical surface of each of said base parts is spherically concave, and wherein the cross-sectional dimensions of the outer side wall of each of said base parts are smaller than the internal dimensions of the associated hollow cavity whereby in operation to form a ring-like space therebetween.

4. A bracket in accordance with claim 1 and wherein said base parts, said head parts and furthermore said hollow cavities are cylindrical.

5. A bracket in accordance with claim 1 and wherein the size of a said base part as measured in the direction of said screw hole within said base part is equal to between ½ and ¼ of the thickness of a said head part and is in particular equal to one third of said thickness.

6. A bracket in accordance with claim 3 wherein the radial width of each said ring-like space is equal to between 1/40 and 1/10 and in particular 1/20 of the outer diameter of said head part and wherein the radial widths of the annular spaces between the fixing screw and the screw holes in the male supporting part lie in the range from 1/30 to 1/10 and are preferably equal to 1/15 of the diameter of the head part.

7. A bracket in accordance with claim 1 wherein the centre of curvature of said part-spherical faces lies on the axis of said screw holes on the side of said part-spherical faces remote from said wall.

8. A bracket in accordance with claim 1 wherein the centre of curvature of said part-spherical faces lies on the axis of said screw holes on the side of said part-spherical faces adjacent said wall.

9. A bracket in accordance with any one of claims 2, 3, 7 or 8 and wherein the part-spherical faces have a radius equal to between 1 and 2 and in particular 1.2 to 1.7 times the radius of a said head part.

10. A bracket in accordance with any one of claims 2, 3, 7 or 8 and wherein the part-spherical faces have a radius equal to between 0.5 and 0.9 and in particular 0.6 and 0.8 times the axial length of a said head part.

11. A bracket in accordance with claim 9 and wherein the radius of said part-spherical faces is between 10 to 20 mm and in particular between 12 to 17 mm.

12. A bracket in accordance with claim 10 and wherein the radius of said part-spherical faces is between 10 to 20 mm and in particular between 12 to 17 mm.

13. A bracket in accordance with claim 1 and wherein the head parts and the associated ends of the hoop-like part are so locked together by at least one substantially radially directed connection element that the hoop-like part, when positioned over the first and second male supporting parts adjacent said wall is axially located relative to the said male supporting parts at least in the direction away from the wall.

14. A bracket in accordance with claim 1 and wherein each said head part is substantially flat at its end face remote from the wall.

15. A bracket in accordance with claim 1 wherein each said head part has a second part-spherical end face at its end remote from the wall and wherein a washer having a partly spherical surface complementary to said second part-spherical surface and an aperture with a markedly greater diameter than an associated fixing screw, and preferably the same diameter as the screw hole in said head part, is disposable between said head part and a head of the associated fixing screw.

16. A bracket in accordance with claim 15 and wherein said second part-spherical end face is convexly spherical.

17. A bracket in accordance with claim 15 and wherein each said washer is flat at its end face remote from the associated head part.

18. A bracket in accordance with claim 15 and wherein the centre of curvature of each said second part-spherical end face lies on the central axis of the screw hole generally at the position of the flat end face of the associated base part.

19. A bracket as claimed in claim 1 in combination with a jig for positioning the bracket, said jig having two bushes with a spacing representative of the spacing between said first and second ends of the hoop-like part with said bushes being adapted to receive said first and second male supporting parts.

20. A bracket and jig combination as claimed in claim 19 and wherein said jig additionally has first and second centre punch holes and/or first and second guide bushes for drills, with the spacing of said first and second centre punch holes and/or said first and second guide bushes being representative of the spacing between said first and second ends of said hoop-like part.

21. A holder or shelf member in particular of moulded synthetic material, and means for fixing first and second ends of said holder or shelf member to a wall or surface, said means comprising first and second male supporting parts receivable in correspondingly shaped first and second cavities in said first and second ends and securable to said wall by respective fixing screws, and wherein each said male supporting part comprises a base part and a head part, said base part having a flat end face for mounting against said wall, a part spherical end face and a central screw hole extending between said flat end face and said part spherical end face, with said central screw hole having a diameter markedly larger than the diameter of an associated fixing screw and said head part having a part spherical end face conplementary to the part spherical end face of said base part, a central screw hole, again markedly greater in diameter than the diameter of an associated fixing screw, and an outer profile complementary to the internal profile of the associated one of said cavities.

* * * * *